United States Patent [19]

Iwasa et al.

[11] Patent Number: 4,764,565
[45] Date of Patent: Aug. 16, 1988

[54] RUBBER WITH NICKEL DITHIOCARBATES

[75] Inventors: Tadanobu Iwasa; Katsumasa Takeuchi; Toshikatsu Kanehara, all of Aichi, Japan

[73] Assignee: Toyoda Gosei Co., Ltd., Nishikasugai, Japan

[21] Appl. No.: 704,402

[22] Filed: Feb. 22, 1985

[30] Foreign Application Priority Data

Feb. 25, 1984 [JP] Japan .................................. 59-35001

[51] Int. Cl.$^4$ .............................................. C08F 8/00
[52] U.S. Cl. .................................. 525/352; 525/332.4
[58] Field of Search ............ 525/195, 192, 352, 332.3, 525/332.4, 332.8

[56] References Cited

U.S. PATENT DOCUMENTS

| 3,076,778 | 2/1963 | Minckler, Jr. et al. | 260/41.5 |
| 3,086,955 | 4/1963 | Lemiszka et al. | 260/41.5 |
| 4,091,195 | 5/1978 | Vitek | 525/332.3 |
| 4,288,576 | 9/1981 | Richwine | 525/349 |
| 4,317,265 | 3/1982 | Chase | 525/332.3 |
| 4,524,185 | 6/1985 | Hinderer | 525/328.2 |

FOREIGN PATENT DOCUMENTS 57-117534 7/1982 Japan .

Primary Examiner—Christopher Henderson
Attorney, Agent, or Firm—Cushman, Darby & Cushman

[57] ABSTRACT

Adhesiveness of a halogenated butyl rubber is improved by blending with it from 5 to 20 weight parts of nickel dithiocarbamate, such as nickel butyl- or diethyldithiocarbamate, per 100 weight parts of the rubber.

5 Claims, 1 Drawing Sheet

RUBBER WITH NICKEL DITHIOCARBATES

BACKGROUND OF THE INVENTION

The present invention relates to a rubber compound and, more particularly, to a rubber compound which is adhered to a metal member when used, such as a shock absorbing rubber element or a rubber bush.

DESCRIPTION OF THE PRIOR ART

Halogenated butyl rubber has an improved vulcanizability over that of butyl rubber and has the following features while retaining the excellent characteristics of the butyl rubber so that it is used widely in industrial rubber products such as tires or shock absorbing rubber elements:
(1) It has a high vulcanizing rate;
(2) It has a thermally stable crosslinkage and an excellent heat resistance; and
(3) It has a high crosslinking efficiency and a low compression permanent strain. . .

This halogenated butyl rubber has a frame made by adding halogen atoms to the side chains of the butyl rubber. As a result, the frame has a smaller number of unsaturated bonds than diene rubber having wide applications and belongs to the class of low unsaturated rubbers. Therefore, the halogenated butyl rubber is inferior in adhesiveness—one of the important characteristics required of rubber products, especially when it is vulcanized.

In order to improve the adhesiveness of the halogenated butyl ruber after being vulcanized, the prior art has been exemplified by buffing the surface the vulcanized rubber, by halogenating the surface of the vulcanized rubber or by adding an adhesive resin such as an alkylphenol resin, all of which have not succeeded in affording sufficient adhesiveness.

SUMMARY OF THE INVENTION

The present invention has been conceived to solve the above-specified problems and has as an object to provide a novel rubber compound which not only can remarkably improve the adhesiveness of halogenated butyl rubber—the adhesiveness of vulcanized one so that it can find useful applications as rubber elements adhered to metal members, when used, such as shock absorbing rubber elements or rubber bushes but also can enhance the adhesiveness in an hot atmosphere or after deterioration by heat so that it can also be excellent in true adhesiveness while it is being used.

In order to achieve the above-specified object, the rubber compound according to the present invention is composed of 100 wt. parts of halogenated butyl rubber and 5 to 20 wt. parts of dithiocarbamate blended therewith.

The other objects of the present invention will become apparent, when the embodiments thereof to be described are understood, and will be defined in the claims appended hereto. Moreover, a number of advantages not explicitly mentioned herein will occur to those skilled in the art after the present invention is put into practice.

DETAILED DESCRIPTION OF THE PREFERRED EMBODIMENTS

Figures 1A, 1B, 1C:
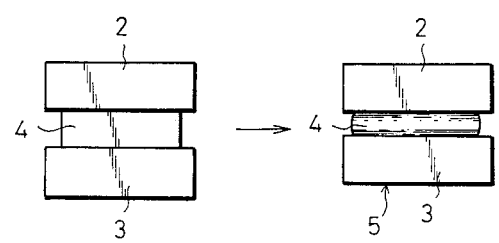
FIGS. 1A to 1C are front elevations showing together a method of preparing samples for testing the adhesiveness of rubber compounds embodying the present invention.

The present invention will be described in the following in connection with the embodiments thereof as to the preparations, the measured results of physical properties and adhesivenesses and the application of samples.

[1] Preparations of Samples of Vulcanized Rubber

In the present example, commercially available chlorinated butyl rubber was used as a material for the halogenated rubber and was blended with the following materials in the following weight fractions:

| | |
|---|---|
| Chlorinated Butyl Rubber | 100 |
| Stearic Acid | 1 |
| Carbon Black (HAF) | 60 |
| Paraffin Process Oil | 10 |
| NBC | 5-20 |
| Zinc Oxide | 5 |
| Vulcanizing Accelerator | 3 |

As the chlorinated butyl rubber, here was used the product of EXXON CHEMICALS Co. (which was known under the trade name of "CHLOROBUTYL 1068"), which had a Mooney viscosity of 50 to 60 (ASTM D1646, ML 1+3, 127° C.) and a grade of the chroline content of 1.1 to 1.3 wt. %. On the other hand, the NBC was an abbreviation of nickel dibutyldithiocarbamate—one of the dithiocarbamates and was the product of OUCHI SHINKO CHEMICAL INDUSTRIAL Co. (which was known under the trade name of "NOCRAC NBC"). This NBC is an aging inhibitor which is generally used to improve the resistances to ozone crack, daylight crack and so on of the diene rubber. The present example used the NBC in the butyl rubber, which did not require it usually, to remarkably improve the adhesiveness.

Here, the rubber compounds containing 5, 7, 10 and 20 wt. parts of NBC were named Samples (1), (2), (3) and (4), respectively.

For comparing purposes, moreover, the rubber compounds containing 0, 1, 3 and 30 wt. parts of NBC were named References (1), (2), (3) and (4), respectively. For preparing the Samples by blending the above-enumerated materials, the components except the zinc oxide and vulcanizing accelerator were added to the chlorinated butyl rubber and were mixed for five minutes by means of the B-type Bunbury mixer (which had a capacity of 1.8 liters). Then, the zinc oxide and the vulcanizing accelerator were added to the mixture and were kneaded for five minutes by means of a ten-inch roller to prepare rubber compounds.

These rubber compounds were press-vulcanized at 160° C. for ten minutes to produce test pieces of 2 mm thickness for testing physical properties and at 160° C. for fifteen minutes to prepare test pieces of 5 mm thickness for testing adhesivenesses.

[2] Treatments of Adhering Fixtures

An iron casting (JIS FC-20) was cut into segments having a thickness of 8 mm and a square of 25 mm, and these segments had their surfaces degreased and then grit-blasted. Subsequently, a priming liquid (which was a product of LORD CORPORATION and known under the trade name of "CHEMLOK 205" composed mainly of a phenol resin) was applied to one side of each segment and was dried at 50° C. for five minutes to form a primer layer having a thickness of about 20 microns. Next, a cover coating liquid (which was another product of LORD CORPORATION and known under the trade name of "CHEMLOK 220" composed mainly of chlorinated rubber) was additionally applied to the primer layer and was dried at 50° C. for five minutes to form a cover coating layer having a thickness of about 20 microns. The segments of cast iron thus prepared were used as the fixtures for testing the adhesivenesses. The aforementioned primer and cover coating layer acted as adhesive layers.

[3] Preparations of Samples for Testing Adhesivenesses

As shown in FIGS. 1A to 1C, a test piece 4 (which had a thickness of 6 mm and a square of 20 mm) of vulcanized rubber for the adhesiveness tests was sandwiched between fixtures 2 and 3 having adhesive layers 1. Next, this sandwich was held at 150° C. for thirty minutes, while being compressed in a compression percentage of 20%, to set the adhesive layers 1 which were composed of the aforementioned primer layers and cover coating layers. After that, the sandwich was released from the compression to prepare a sample 5 for the adhesiveness tests.

[4] Measurements of Physical Properties

The aforementioned test pieces of 2 mm in thickness for the physical property tests were measured as to their hardnesses, tensile strengths, elongations and tearing strengths, which are enumerated in the following Table 1:

TABLE 1

| | (Physical Properties) | | | |
|---|---|---|---|---|
| | Hardness Hs | Tensile Strength kg/cm² | Elongation % | Tearing Strength kg/cm |
| Ref (1) | 70 | 171 | 410 | 39 |
| Ref (2) | 70 | 166 | 400 | 40 |
| Ref (3) | 70 | 165 | 480 | 42 |
| Ref (4) | 67 | 98 | 420 | 37 |
| Ex (1) | 70 | 160 | 500 | 41 |
| Ex (2) | 70 | 153 | 510 | 41 |
| Ex (3) | 70 | 146 | 530 | 42 |
| Ex (4) | 69 | 125 | 550 | 45 |

It is apparent from Table 1 that the respective examples had larger elongations than the references by having suitable blends of the NBC.

[5] Measurements of Adhesivenesses

The sample 5 was chucked by an autographic recording device and was pulled at an angle 180° at a pulling speed of 30 mm/min. to measure the adhesiveness at a room temperature. Moreover, sample 5 has its fractured state observed to determine the ratio of (the surface fracture percentage (%) of rubber fracture)/(the surface fracture percentage (%) of the interfacial fracture between the adhesives and the rubber). The results of the measurements are enumerated in Table 2:

TABLE 2

| | Adhesiveness kg/cm² | Fractured Rubber State |
|---|---|---|
| Ref (1) | 35 | 80/20 |
| Ref (2) | 45 | 90/10 |
| Ref (3) | 54 | 100/0 |
| Ref (4) | 52 | 100/0 |
| Ex (1) | 53 | 100/0 |
| Ex (2) | 55 | 100/0 |
| Ex (3) | 54 | 100/0 |
| Ex (4) | 56 | 100/0 |

It is apparent from Table 2 that the respective examples had their adhesivenesses improved remarkably over references (1) and (2) containing less NBC by the actions of the NBC and that the fractures were caused to propagate wholly in the rubber because of the high strength of the adhered interfaces.

On the other hand, it is possible to grasp the true adhesivenesses under use conditions by measuring the adhesivenesses in a hot atmosphere and after deterioration by heat. After the test pieces had been held at a hot atmosphere for one hour, therefore, their adhesivenesses were measured, which are enumerated in Table 3. The adhesivenesses were also measured at a room temperature, as enumerated in Table 4, after the test pieces had been held at a high atmosphere of 120° C. for seventy hours and then naturally cooled:

TABLE 3

| | (in Hot Atmosphere) | |
|---|---|---|
| | Adhesiveness kg/cm² | Fractured Rubber State |
| Ref (1) | 9 | 40/60 |
| Ref (2) | 12 | 40/60 |
| Ref (3) | 17 | 60/40 |
| Ref (4) | 22 | 100/0 |
| Ex (1) | 25 | 100/0 |
| Ex (2) | 26 | 100/0 |
| Ex (3) | 25 | 100/0 |
| Ex (4) | 24 | 100/0 |

TABLE 4

| | (after Deterioration by Heat) | |
|---|---|---|
| | Adhesiveness kg/cm² | Fractured Rubber State |
| Ref (1) | 25 | 30/70 |
| Ref (2) | 35 | 60/40 |
| Ref (3) | 40 | 70/30 |
| Ref (4) | 43 | 100/0 |
| Ex (1) | 45 | 100/0 |
| Ex (2) | 47 | 100/0 |
| Ex (3) | 47 | 100/0 |
| Ex (4) | 46 | 100/0 |

It is apparent from Tables 3 and 4 that the respective examples had their adhesivenesses improved remarkably over the references (1), (2) and (3) containing less NBC by the actions of the NBC even in the hot atmosphere or after the deterioration by heat and that the fractures were caused to propagate wholly in the rubber.

The rubber compound having the excellent adhesiveness thus far described according to the present invention can find a wide variety of applications as rubber elements adhered to the metal members when used, such as the shock absorbing rubber elements for automotive engines or the rubber elements for bushes.

Incidentally, the present invention should not be limited to the above-specified compositions of the examples but can be arbitrarily modified and embodied within the scope of the invention. For example, brominated butyl rubber may be used as the halogenated butyl rubber, and nickel diethyldithiocarbamate may be used as the dithiocarbamate.

Since it is apparent that a wide variety of modifications can be made without trespassing the spirit and scope of the present invention, it should be noted that the present invention be not limited by the specified embodiments but defined by the appended claims.

What is claimed is:

1. A method of improving the adhesiveness of a halogenated butyl rubber to a metal surface comprising blending into said butyl rubber from 5 to 20 weight parts of nickel dithiocarbamate per 100 weight parts of rubber.

2. The method of claim 1 in which the rubber is chlorinated butyl rubber.

3. The method of claim 1 in which the rubber is brominated butyl rubber.

4. The method of claim 1 in which the nickel dithiocarbamate is nickel di($C_{1-4}$alkyl)dithiocarbamate.

5. The method of claim 2 in which the rubber is chlorinated butyl rubber blended with stearic acid, carbon black, paraffin process oil, zinc oxide, a vulcanizing accelerator together with the nickel dithiocarbamate.

* * * * *